United States Patent [19]
Schafer et al.

[11] Patent Number: 6,139,227
[45] Date of Patent: Oct. 31, 2000

[54] HOLDER FOR FREE-CUTTING MACHINING TOOL INSERTS

[75] Inventors: Hans Schafer, Gomaringen; Matthias Oettle, Wendlingen, both of Germany

[73] Assignee: Hartmetall-Werkzeugfabrik Paul Horn GmbH, Germany

[21] Appl. No.: 09/251,738

[22] Filed: Feb. 18, 1999

[30] Foreign Application Priority Data

Feb. 21, 1998 [DE] Germany .................... 198 07 498

[51] Int. Cl.⁷ .................................................. B23B 27/16
[52] U.S. Cl. .................. 407/110; 407/109; 407/116; 407/117; 407/111
[58] Field of Search .................... 407/110, 109, 407/107, 106, 111, 116, 117

[56] References Cited

U.S. PATENT DOCUMENTS

| | | | |
|---|---|---|---|
| 2,825,959 | 3/1958 | Bader | 407/109 |
| 4,321,846 | 3/1982 | Neamtu | 407/109 |
| 5,207,537 | 5/1993 | Englund | 407/110 |
| 5,516,241 | 5/1996 | Plutschuck et al. | 407/110 |
| 5,934,843 | 8/1999 | Brask et al. | 407/106 |

FOREIGN PATENT DOCUMENTS

| | | |
|---|---|---|
| 0095062 | 11/1983 | European Pat. Off. . |
| 0259874B1 | 3/1988 | European Pat. Off. . |
| 0568515A1 | 1/1993 | European Pat. Off. . |
| 2373349 | 7/1998 | France . |
| 3301919 | 7/1984 | Germany . |
| 8804365 | 5/1988 | Germany . |
| 8804365 U | 5/1988 | Germany . |
| 8915043 | 5/1990 | Germany . |
| 685680 | 9/1995 | Switzerland . |
| 1284716 | 1/1987 | U.S.S.R. . |

*Primary Examiner*—Henry W. H. Tsai
*Attorney, Agent, or Firm*—Roylance, Abrams, Berdo Goodman, L.L.P.

[57] ABSTRACT

A holder for free-cutting machining tool inserts, especially for chiseling, piercing or cutting inserts, includes an essentially beam-like edge support (1) with a receiving pocket (5) constructed in its end for the blade edge inserts. Clamping jaws (9 and 11) define the narrow width of the receiving pocket (5). A slot (29) is configured in the blade edge support (1) forming a flexible pivot for moving one clamping jaw. An operating member (37) is provided for producing a clamping force in the area of the slot (29) on the movable clamping jaw (11). The operating member (37) is mounted in a bore (39) at some distance from the slot (29). The clamping force is transmitted to the movable clamping jaw (11) through a force transmission member (43) which is slidably guided in the blade edge support (1).

25 Claims, 5 Drawing Sheets

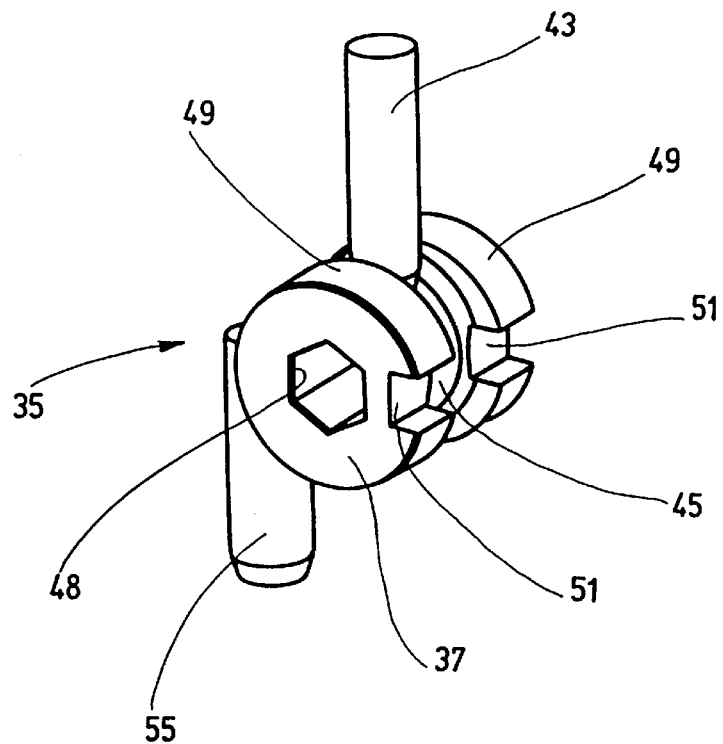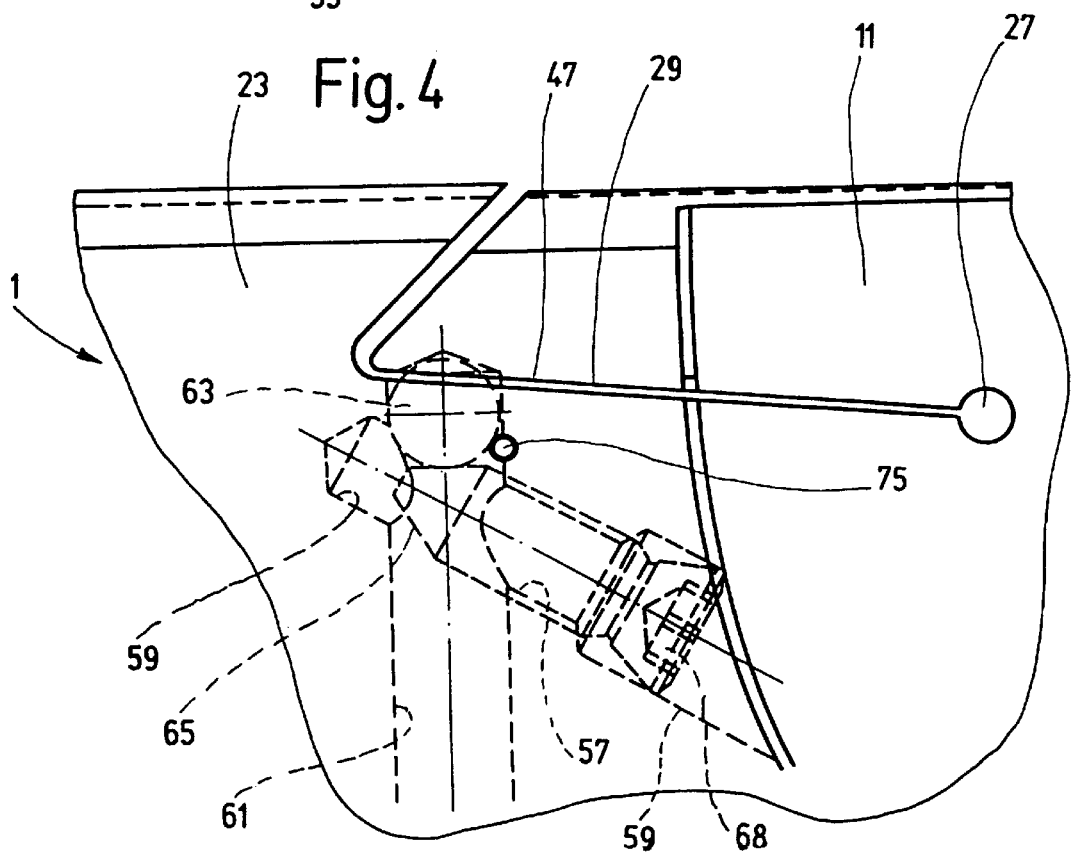

HOLDER FOR FREE-CUTTING MACHINING TOOL INSERTS

FIELD OF THE INVENTION

The invention relates to a holder for free-cutting machining tool inserts, especially chiseling, piercing or cutting inserts. The holder has an essentially beam-like blade edge support, and a recess configured at the end of this support. The recess serves as a receiving pocket for the inserts, and is defined by clamping jaws forming the narrow width of the receiving pocket. A slot extends from the side of the blade edge support nearly to the interior end of the receiving pocket to facilitate flexible pivotal movement of one of the clamping jaws. The holder also has a clamping device which, for the production of a clamping force operating in the vicinity of the slot of the pivotal clamping jaws, has a rotatably mounted operating member.

BACKGROUND OF THE INVENTION

Holders, such as those disclosed in EP 0 259 847 A1, have a slot provided in the blade edge support interrupted by a bore. A wedge element projects into the bore and is adjustable for production of the clamping force working on the pivoting clamping jaw by means of a clamping bolt. In this case, the danger exists that a transverse force component is produced when there is too forceful or improper tightening of the clamping bolt extending through the slot additional to the desired clamping force. Such transverse force component causes the pivot motion of the clamping jaw in the main plane of the blade edge support, which blade edge support engages on the movable clamping jaw as disruptive bending force.

SUMMARY OF THE INVENTION

Objects of the present invention are to provide a holder for free-cutting machining tool inserts in which, despite the great clamping force produced by the clamping device, no danger exists that disruptive transverse force components will engage the movable clamping jaw.

The foregoing objects are basically obtained by a holder for free-cutting machining tool inserts, comprising a beam-like blade edge support with a recess at a first end of the blade edge forming an insert receiving pocket. The pocket has a narrow width portion and a widened interior terminal end. Clamping jaws define the narrow width portion of the pocket. A slot extends from a side of the blade edge support to an area adjacent the widened terminal end to form a flexible pivot for pivotally moving one of the clamping jaws. A clamp applies a clamping force in an area of the slot on the one clamping jaw. The clamp includes an operating member rotatably mounted in a first bore in the blade edge support and a force transmission member. The first bore is spaced from the slot by a distance. The force transmission member transmits the clamping force from the operating member to the one clamping jaw, and is guided for sliding movement in the blade edge support.

As a result of the spatial separation between the operating member and the slot, the clamping force is transferred through a structural element guided in the blade edge support to the clamping jaw. The transmission of force then occurs along a defined line of application of the force. Disruptive transverse forces are completely prevented. Thus, processing can be carried out using comparatively high clamping forces without any problem and in safety.

For functional efficiency, the force transmission member can be in a second bore in the blade edge support, with the axis of the second bore extending at an angle to the axis of the first bore and intersecting this axis at some distance from the slot.

The operating member of the clamping arrangement can be embodied in the form of an eccentric cam. The force transmission member can be supported at one end on the radius of the eccentric cam and at the other end of the movable clamping jaw. Instead of the eccentric cam, a pivotal or rotatable cam can also be provided, with a cam surface of lower or more moderate pitch or inclination, for example, in the form of a worm screw with linear pitch.

Alternatively, the first bore can be provided with interior threading to receive a clamping screw to serve as the operating member of the clamping arrangement. The screw can have a conically shaped end at its end area projecting into the second bore. The conically shaped end, in cooperation with the force transmission member guided in the second bore, produces a force component which can be transmitted along the second bore.

For this arrangement, a ball can be supported on one side on the conically shaped end of the clamping screw and on the other side on the movable clamping jaw. Likewise, a pin supported on the conically shaped end could be used instead of a ball.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 3 is a perspective view of the clamping arrangement of the holder of FIGS. 1 and 2;

FIG. 4. is an enlarged, cut open, partial, side elevational view shown at the same scale as FIGS. 1 to 3, of a holder according to a second embodiment of the present invention;

DETAILED DESCRIPTION OF THE INVENTION

Figure 1:
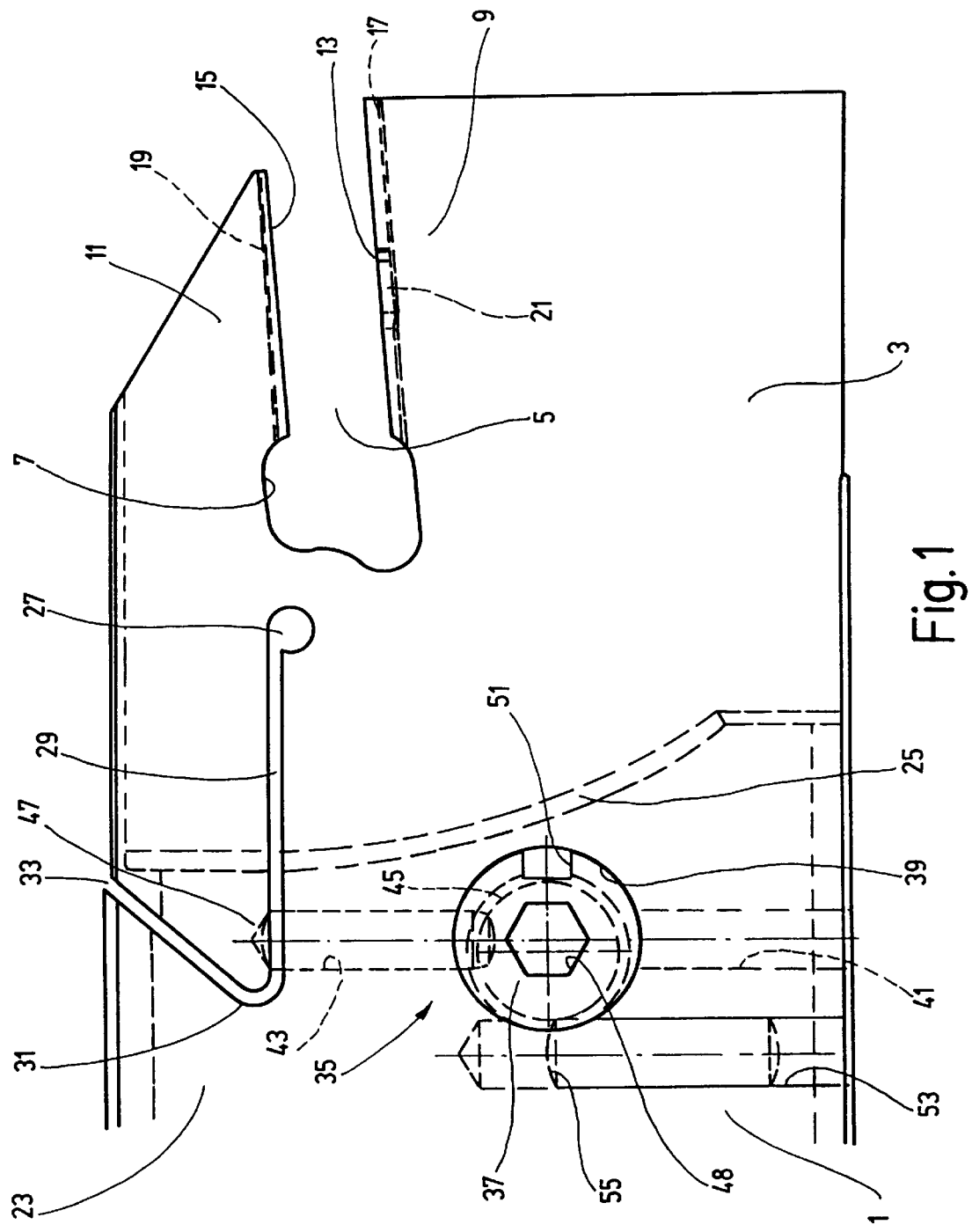
FIG. 1 is an enlarged side elevational view cut open, approximately in 4:1 scale, of a holder according to a first embodiment the present invention.
Figure 2:
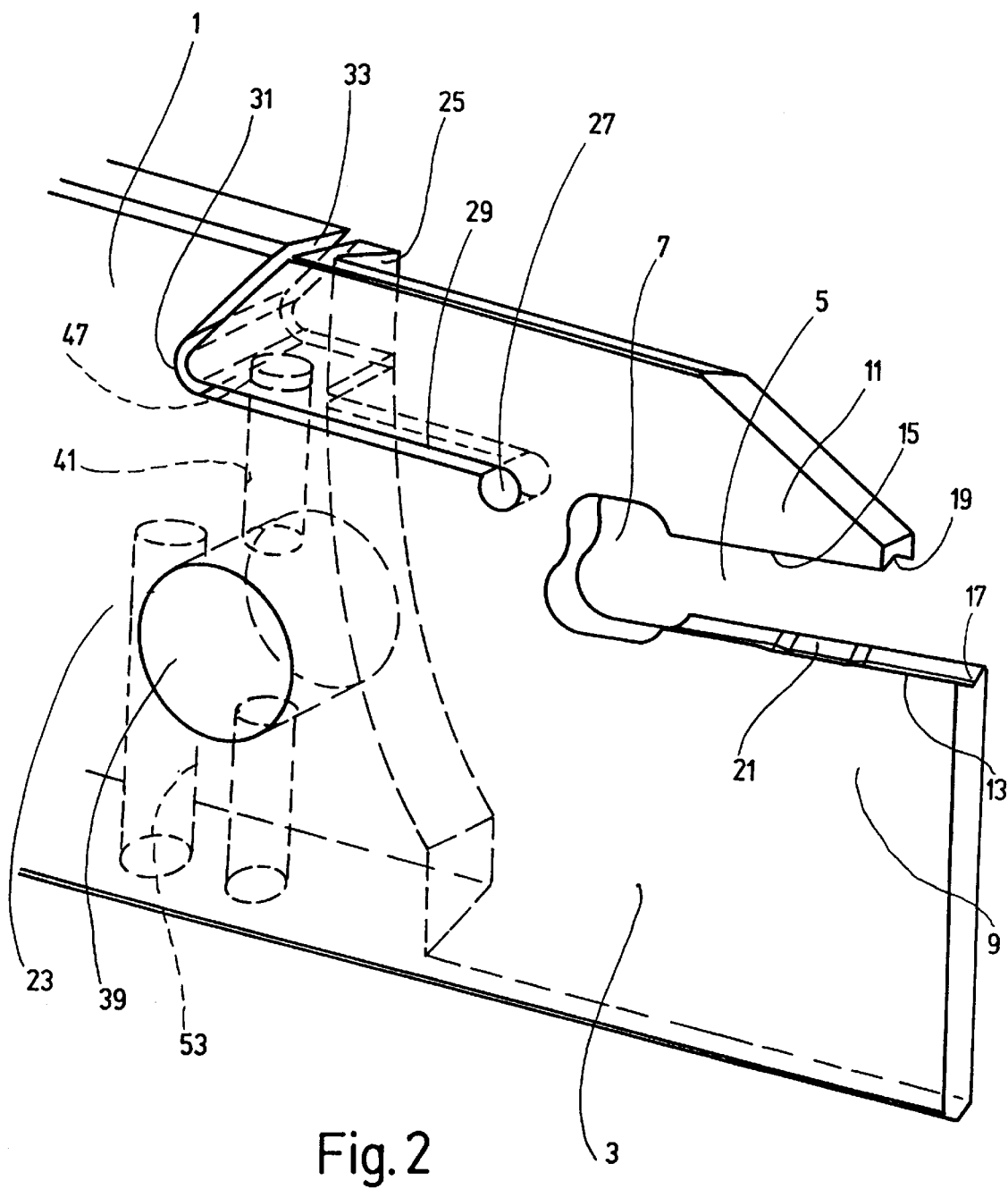
FIG. 2 is a partial perspective view of the holder of FIG. 1, showing only the blade edge support without the clamping arrangement.

A first exemplary embodiment of the holder for tool inserts, according to the present invention, is illustrated in FIGS. 1 to 3. FIGS. 1 to 2 show the forward part of a blade edge support 1, without showing insertion of a tool insert which can be tightly clamped therein. Such holders of the traditional type are arranged with a receiving pocket 5 in the front end area 3 of the blade support 1. Receiving pocket 5 is in the form of an opening, open to the front. The opening has a widened out area 7 in the interior of area 3. In the area contiguous to widened out area 7, extending forwardly therefrom, the narrow width of receiving pocket 5 limited by two clamping jaws 9 and 11 with their clamping surfaces 13 and 15 facing another. A tool insert can be clamped between clamping surfaces 13 and 15. As a particularly shown in FIG. 2, clamping surfaces 13 and 15 have V-shaped longitudinal grooves 17 and 19, respectively. A local depression or recess 21 is cut into groove 17. This shaping of clamping surfaces 13 and 15 serves for the precise positioning of the tool insert provided with complementary contouring for this purpose.

To adapt the holder to the remarkably narrow width of chiseling or piercing inserts to be clamped in receiving pocket 5, the blade edge support is of narrower width in its tapered front end area 3 than in its non-tapered rear beam-like part 23. The transition between narrow front end area 3 and rear beam-like part or end area 23 is formed by a slightly curved shoulder surface 25.

Starting from an opening 27 adjacent to the interior end of widened-out part 7 of receiving pocket 5, a slot 29 is formed. Slot 29 opens all the way through, and extends in the blade edge support 1 in a straight line as far as beam-like part 23 essentially parallel to the blade edge support top edge to a point 31. At point 31, the straight segment of slot 29 terminates, and assumes a path extending obliquely upward and forward. Slot 29 terminates at the top edge of beam-like part 23 of blade edge support 1 at point 33.

A flexible, pivotally movable clamping jaw 11 is formed by slot 29. Its pivot point lies in the area between opening 27 and the adjacent edge of widened out part 7. Thus, a widening of slot 29 occurs in its rearward area adjacent to point 31, causing clamping surface 15 of clamping jaw 11 to approach the facing clamping surface 13 of clamping jaw 9 to obtain the tight fixing of the relevant tool insert in receiving pocket 5 by means of secure clamping.

The individual component parts of a clamping arrangement 35 for producing a clamping force, which force widens out slot 29 in its rearward area adjacent to point 31 in order to pivot clamping jaw 11, are show in FIGS. 1 and 3. An eccentric cam 45 is provided as the operating member of clamping arrangement 35, and is constructed on a pivot bearing 37. Pivot bearing 37 is mounted to rotate or pivot in a transverse bore 39 configured in beam-like part 23 of blade edge support 1. A second bore 41, extends from the bottom edge of beam-like part 23 and passes through part 23 as far as slot 29 where it opens adjacent to point 31. Bore 41 intersects transverse bore 39 at a right angle in its central axis. The segment of bore 41 between transverse bore 39 and slot 29 forms a guide in which a longitudinal slidable force transmission pin 43 is held. Pin 43 is supported on at one end on the radius of eccentric cam 45 (see especially FIG. 3) and at the other end on the rearward part 47 of movable clamping jaw 11, adjacent to point 31 of slot 29.

Eccentric cam 45 is formed by an angular groove forming a depression in the periphery of circular cylindrical pivot bearing 37, and is offset relative to its axis. The bearing has a torx or an interior hexagonal recess 48 for the pivotal or rotational operation of pivot bearing 37 mounted in transverse bore 39. Before insertion of pivot bearing 37 into bore 39, force transmission pin 43 can be introduced from the blade edge support bottom through the open end of bore 41. In order that pivot bearing 37 can then be introduced into transverse 39, pivot bearing 37 has openings 51 in its walls 49. Walls 49 limit the cam 45 and form an annular groove therebetween. Suitable pivotal arrangement of pivot bearing 37 can facilitate its introduction into transverse bore 39, following the insertion of force transmission pin 43.

Another bore 53 extends parallel to bore 41 and tangent transverse bore 39 in the middle area, in which is located the depressed annular groove forming eccentric cam 45. With insertion of a locking pin 55 into bore 53 and between walls 49 which engage locking pin 55, pivot bearing 37 is secured against axial sliding relative to transverse bore 39, as shown in FIGS. 1 and 3.

With pivoting of pivot bearing 37 by means of a tool cooperating with and insert into interior hexagonal recess 48, through the force transmission pin 43, a clamping force can be produced to work between the clamping surfaces 13 and 15. The guiding of force transmission pin 43 in bore 41 causes the transmission of the clamping force free of transverse forces. With more moderate pitch or inclination of eccentric cam 45 in cooperation with force transmission pin 43, the self-impeding effect of the pivot bearing 37, mounted pivotally and adaptively in transverse bore 39, is guaranteed. Thus, the clamping of the tool inserted in the clamping gap between clamping jaws 9 and 11 can be terminated by compulsory reverse rotation or pivoting of pivot bearing 37.

Figure 5:
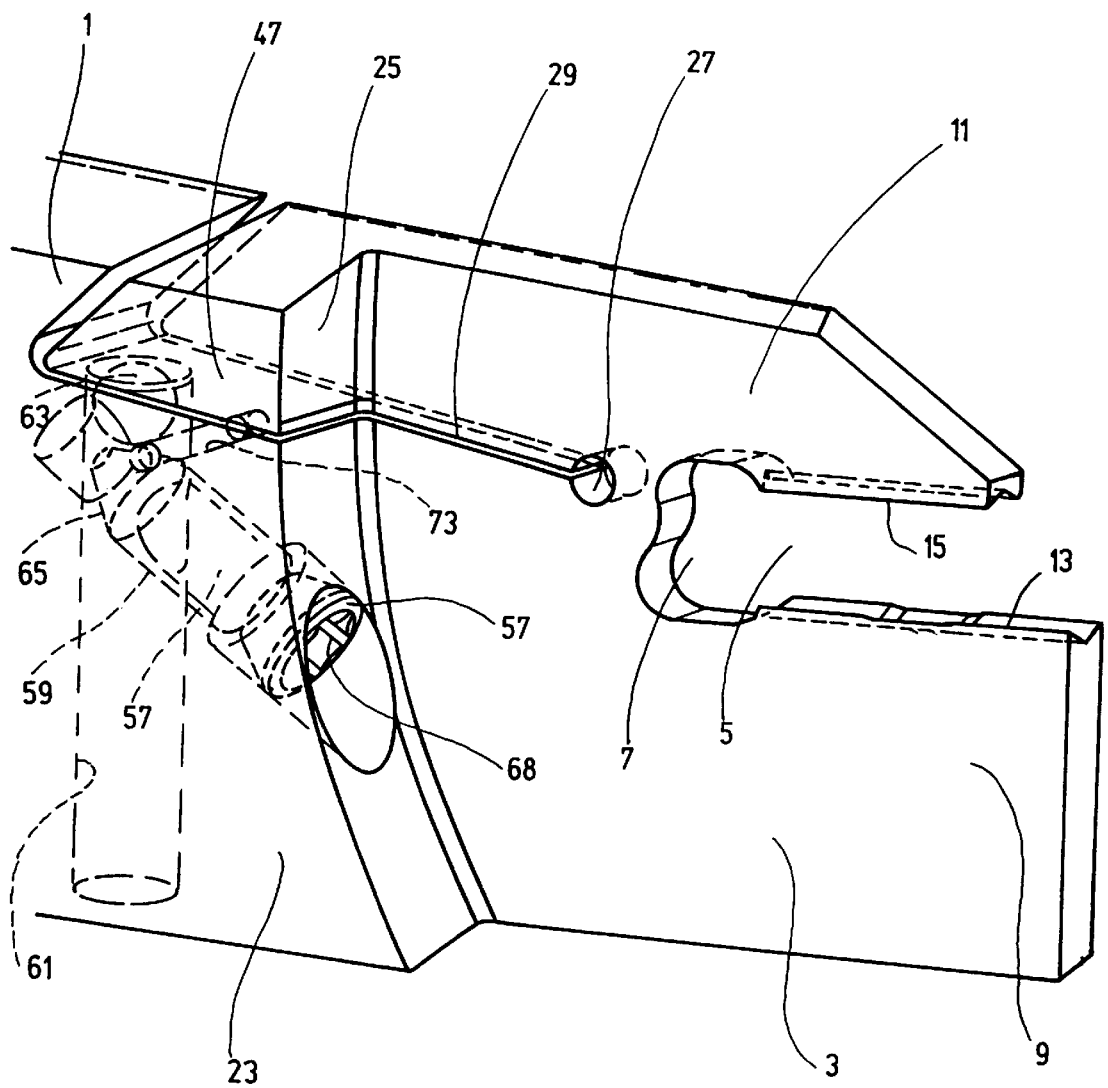
FIG. 5 is a partial perspective view of the holder of FIG. 4.

FIGS. 4 and 5 show a second embodiment of the present invention in which a clamping screw 57 is provided as the pivotal or rotational operating member of the clamping arrangement. Clamping screw 57 is mounted in bore 59 provided with interior threading. Bore 59 extends at an angle to a second bore 61. Second bore 61 serves as guide for the force transmission member. Bores 59 and 61 intersect in the vicinity of slot 29. The opening of bore 59 to the exterior is located on shoulder surface 25, which shoulder surface forms the interruption between the narrow front end area 3 and the rear beam-like part 23 of blade edge support 1. A torx or an interior hexagonal recess 68 of clamping screw 57 for its pivotal or rotational operation is accessible through this opening.

At the other or inner end, clamping screw 57 has a conically shaped end 65 which projects into the second bore 61. A ball 63, provided as the force transmission member, is supported on one side on the conical end 65 and on the other side on the bottom of the rearward part 47 of movable clamping jaw 11. To prevent ball 63 from falling out of bore 61 when clamping screw 57 is screwed out, a locking pin 75 is inserted in a locking bore 73 extending beneath ball 63 transverse to bore 61.

The operation of the second embodiment corresponds to that on the first embodiment. With screwing in of clamping screw 57, the peripheral surface of the conically shaped end 65 at the end of the clamping screw produces a clamping force by interacting with ball 63. Ball 63 is guided in bore 61 so that only a force component with the line of application of the force extending along the axis of bore 61 is applied on part 47 movable clamping jaw 11. The force is applied without the effect of any transverse force component. The clamping arrangement is self-impeding, in other words, the tensional force or clamping power with which a relevant tool insert is clamped securely in receiving pocket 5 can be terminated only by unscrewing of clamping screw 57. Pin 43 can be used in place of ball 63 in the second embodiment of the present invention.

Figure 6:
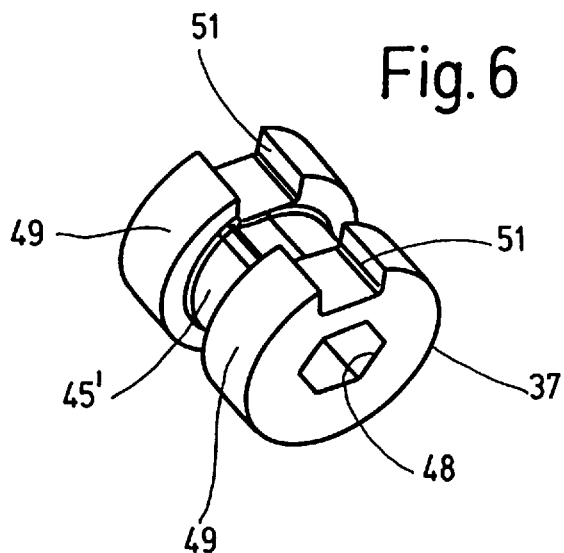
FIG. 6 is a perspective view of a bearing of the clamping arrangement of a holder according to a third embodiment of the present invention.
Figure 7:
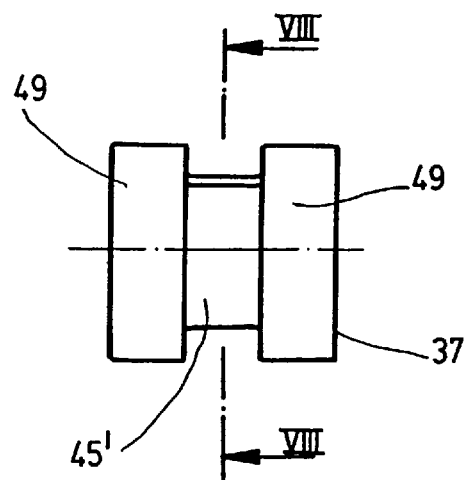
FIG. 7 is a side elevational view of the bearing of FIG. 6.
Figure 8:
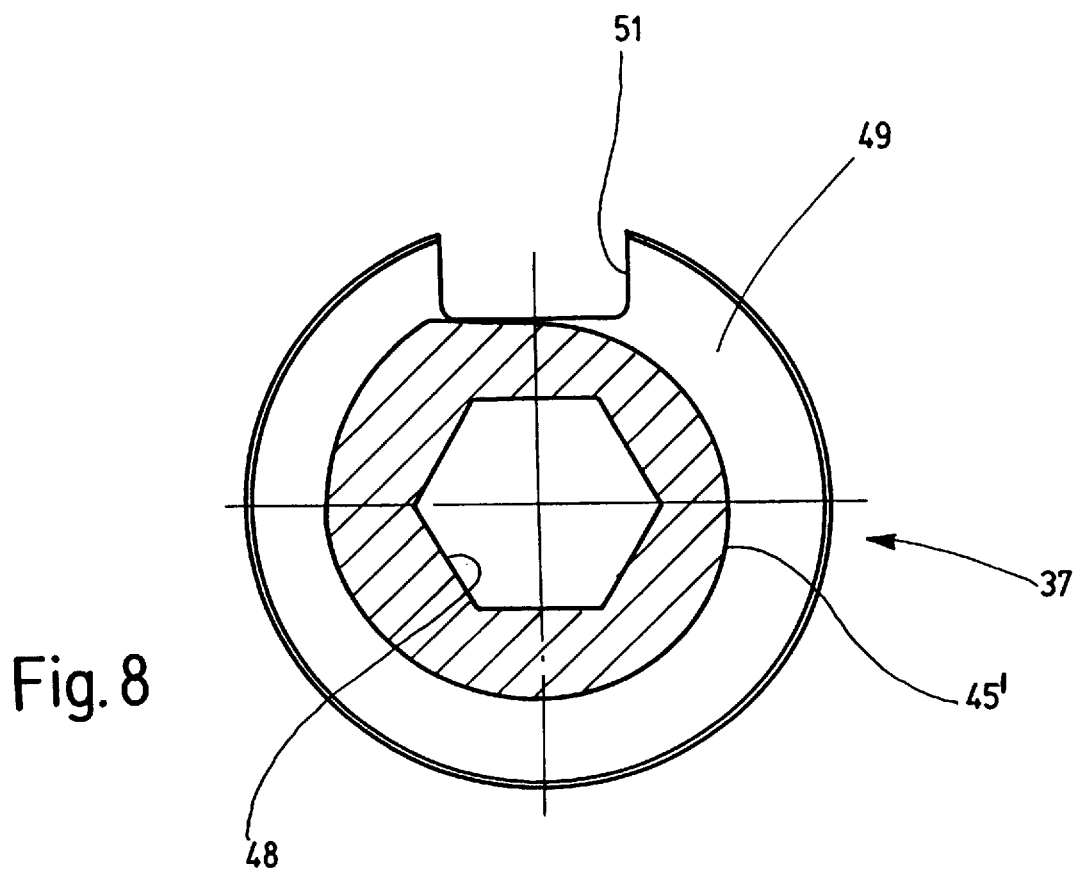
FIG. 8 is an end elevational view in section shown in a larger scale and taken along line VIII—VIII of FIG. 7.

FIGS. 6 to 8 disclose a third embodiment of the holder according to the present invention. This embodiment differs from the first embodiment as shown in FIGS. 1 to 3 only by a modified construction of the operating member of the clamping arrangement. As with the first embodiment, the operating member uses a pivot bearing 37, which is mounted to rotate in the transverse bore 39 of blade edge support 1. Differing from the first exemplary embodiment, the annular groove in the form of a depression between the walls 49 does not form a circular, axially offset eccentric cam. Rather, the annular groove forms a pivotal cam 45'. As is to be seen especially from FIG. 8, pivotal cam 45' has a peripheral cam surface having a more moderate pitch or inclination. Starting from the smallest radius on the area aligned with opening 51, the peripheral cam surface extends as a worm screw with linear pitch or inclination over an angle range of 320 degrees.

While various embodiments have been chosen to illustrate the invention, it will be understood by those skilled in the art that various changes and modifications can be made therein without departing from the scope of the invention as defined in the appended claims.

What is claimed is:

1. A holder for machining tool inserts, comprising:

a beam-like blade edge support;

a recess at a first end of said blade edge support forming an insert receiving pocket, said pocket having a narrow width portion and a widened interior terminal end;

clamping jaws defining said narrow width portion of said pocket;

a slot extending from a side of said blade edge support to an area adjacent said widened terminal end to form a flexible pivot for pivotally moving one of said clamping jaws; and a clamp applying a clamping force in an area of said slot on said one clamping jaw, said clamp including an operating member rotatably mounted in a first bore in said blade edge support and a force transmission member, said first bore being spaced from said slot by a distance, said force transmission member transmitting the clamping force from said operating member to said one clamping jaw and being guided for sliding movement in said blade edge support in a second bore, said second bore extending along an axis oriented at an angle to an axis of said first bore and intersecting said first bore at a distance from said slot, said operating member including an eccentric cam, said force transmitting member including a pin supported at a first end thereof on a radius of said eccentric cam and at a second end thereof on said one clamping jaw.

2. A holder according to claim 1 wherein said second bore extends from one side of said blade edge support perpendicularly to a longitudinal axis of said blade edge support from said first bore to said slot;

said first bore extends perpendicularly to said second bore and forms a pivot bearing for said cam.

3. A holder according to claim 2 wherein said cam comprises an annular groove formed as a depression in a periphery of a circular cylindrical bearing, said cylindrical bearing having walls limiting said annular groove, at least one of said walls having an opening in an area of greatest depth of said annular groove facilitating passage of said pin during installation of said cylindrical bearing in said first bore.

4. A holder according to claim 3 wherein said blade edge support comprises a third bore parallel to said second bore, said third bore being tangent to said first bore adjacent said annular groove; and a locking pin is received in said third bore and in said annular groove.

5. A holding according to claim 1 wherein said is rotatable and has a cam surface with a low pitch ending over an angular circumferenced range of approximately 320 degrees; and said first end of said pin is supported on said cam surface.

6. A holding according to claim 5 wherein said second bore extends from one side of said blade edge support perpendicularly to a longitudinal axis of said blade edge support from said first bore to said slot;

said first bore extends perpendicularly to said second bore and forms a pivot bearing for said cam.

7. A holding according to claim 6 wherein said cam comprises an annular groove formed as a depression in a periphery of a circular cylindrical bearing, said cylindrical bearing having walls limiting said annular groove, at least one of said walls having an opening in an area of greatest depth of said annular groove facilitating passage of said pin during installation of said cylindrical bearing in said first bore.

8. A holding according to claim 7 wherein said blade edge support comprises a third bore parallel to said second bore, said third bore being tangent to said first bore adjacent said annular groove; and a locking pin is received in said third bore and in said annular groove.

9. A holder according to claim 1 wherein said operating member comprises a hexagonal recess on an outer surface thereof.

10. A holder according to claim 1 wherein said blade edge support comprises a tapered forward end area including in which said receiving pocket is located, and a non-tapered rear end area, said forward end area being narrower than said rear end area;

said slot extends from said forward end area into said rear end area; and said first and second bores are in said rear end area.

11. A holder for machining tool inserts, comprising:

a beam-like blade edge support;

a recess at a first end of said blade edge support forming an insert receiving pocket, said pocket having a narrow width portion and a widened interior terminal end;

clamping jaws defining said narrow width portion of said pocket;

a slot extending from a side of said blade edge support to an area adjacent said widened terminal end to form a flexible pivot for pivotally moving one of said clamping jaws; and a clamp applying a clamping force in an area of said slot on said one clamping jaw, said clamp including an operating member rotatably mounted in a first bore in said blade edge support and a force transmission member, said first bore including an internal thread and being spaced from said slot by a distance, said force transmission member transmitting the clamping force from said operating member to said one clamping jaw and being guided for sliding movement in said blade edge support in a second bore, said second bore extending along an axis oriented at an angle to an axis of said first bore and interesting said first bore at a distance from said slot, said operating member including a clamping screw threadly engaged with said internal thread, said clamping screw having a conically shaped end portion projecting into said second bore and engaging said force transmission member for movement thereof along said second bore.

12. A holding according to claim 11 wherein
said force transmission member comprises a ball supported on one side on said conically shaped end portion and on another side on said one clamping jaw.

13. A holder according to claim 11 wherein
said force transmission member comprises a pin supported at a first end thereof on said conically shaped end portion and at a second end thereof on said one clamping jaw.

14. A holder according to claim 11 wherein
said blade edge support comprises a shoulder surface forming a transition between said front end area and said rear end area; and
said first bore opens and shoulder surface.

15. A holder according to claim 11 wherein
said operating member comprises a hexagonal recess on an outer surface thereof.

16. A holder according to claim 11 wherein
said blade edge support comprises a tapered forward end area in which said receiving pocket is located, and a non-tapered rear end area, said forward end area being narrower than said rear end area;
said slot extends from said forward end area into said rear end area; and
said first and second bores are in said rear end area.

17. A holder for machining tool inserts, comprising:
a beam-like blade edge support;
a recess at a first end of said blade edge support forming an insert receiving pocket, said pocket having a narrow width portion and a widened interior terminal end;
clamping jaws defining said narrow width portion of said pocket;
a slot extending from a side of said blade edge support to an area adjacent said widened terminal end to form a flexible pivot for pivotally moving one of said clamping jaws; and
a clamp applying a clamping force in an area of said slot on said one clamping jaw, said clamp including an operating member rotatably mounted in a first bore in said blade edge support and a force transmission member, said first bore being spaced from said slot by a distance, said force transmission member transmitting the clamping force from said operating member to said one clamping jaw and being guided for sliding movement in said blade edge support in a second bore, said second bore extending along an axis oriented at an angle to an axis of said first bore and intersecting said first bore at a distance from said slot, said operating member including a rotatable cam having a cam surface with a low pitch ending over an angular circumferenced range of approximately 320 degrees, said force transmitting member including a pin supported at a first end thereof on said cam surface and at a second end thereof on said one clamping jaw.

18. A holding according to claim 17 wherein
said second bore extends from one side of said blade edge support perpendicularly to a longitudinal axis of said blade edge support from said first bore to said slot; and
said first bore extends perpendicularly to said second bore and forms a pivot bearing for said cam.

19. A holding according to claim 18 wherein
said cam comprises an annular groove formed as a depression in a periphery of a circular cylindrical bearing, said cylindrical bearing having walls limiting said annular groove, at least one of said walls having an opening in an area of greatest depth of said annular groove facilitating passage of said pin during installation of said cylindrical bearing in said first bore.

20. A holding according to claim 19 wherein
said blade edge support comprises a third bore parallel to said second bore, said third bore being tangent to said first bore adjacent said annular groove; and
a locking pin is received in said third bore and in said annular groove.

21. A holder according to claim 17 wherein
said operating member comprises a hexagonal recess on an outer surface thereof.

22. A holder according to claim 17 wherein
said blade edge support comprises a tapered forward end area in which said receiving pocket is located, and a non-tapered rear end area, said forward end area being narrower than said rear end area;
said slot extends from said forward end area into said rear end area; and
said first and second bores are in said rear end area.

23. A holder according to claim 17 wherein
said second bore extends from one side of said blade edge support perpendicularly to a longitudinal axis of said blade edge support from said first bore to said slot;
said first bore extends perpendicularly to said second bore and forms a pivot bearing for said cam.

24. A holder according to claim 23 wherein
said cam comprises an annular groove formed as a depression in a periphery of a circular cylindrical bearing, said cylindrical bearing having walls limiting said annular groove, at least one of said walls having an opening in an area of greatest depth of said annular groove facilitating passage of said pin during installation of said cylindrical bearing in said first bore.

25. A holder according to claim 24 wherein
said blade edge support comprises a third bore parallel to said second bore, said third bore being tangent to said first bore adjacent said annular groove; and
a locking pin is received in said third bore and in said annular groove.

* * * * *